United States Patent [19]

Naito

[11] Patent Number: 4,798,253
[45] Date of Patent: Jan. 17, 1989

[54] ELECTRIC POWER STEERING APPARATUS
[75] Inventor: Hiroshi Naito, Toyota, Japan
[73] Assignee: Aisin Seiki Kabushiki Kaisha, Kariya, Japan
[21] Appl. No.: 77,187
[22] Filed: Jul. 21, 1987
[30] Foreign Application Priority Data Jul. 22, 1986 [JP] Japan .................... 61-172091

[51] Int. Cl.$^4$ ............................... B62D 5/04
[52] U.S. Cl. .................. 180/79.1; 73/862.33; 180/133
[58] Field of Search ............... 180/133, 141, 142, 143, 180/79.1; 73/708, 862.33, 862.35, 862.32, 781

[56] References Cited

U.S. PATENT DOCUMENTS 3,910,106 10/1975 Brady ........................ 73/88.5 R
4,724,711 2/1988 Sakakibara et al. ........... 180/79.1 X

FOREIGN PATENT DOCUMENTS

2586807 3/1987 France ...................... 180/79.1
58-133957 8/1983 Japan ....................... 180/79.1
58-177773 10/1983 Japan ....................... 180/79.1
58-194664 11/1983 Japan ....................... 180/79.1
61-155056 7/1986 Japan ....................... 180/79.1

Primary Examiner—David M. Mitchell
Assistant Examiner—Charles R. Watts
Attorney, Agent, or Firm—Burns, Doane, Swecker & Mathis

[57] ABSTRACT

An electric power steering apparatus comprising an axial conversion mechanism includes a slider for converting the relative rotation between an input shaft and an output shaft to an axial deviation. A first sensing unit senses axial deviation of the slider. It includes a lever with a torque sensing element fixed thereto with the lever fixed at one end and supported at the other end by the slider. A second sensing unit senses the direction of rotation, or the direction and torque of rotation, of a steering wheel. A controller compares the output signals from the first and second sensing units and controls the direction and torque of rotation of an electric motor which contributes to the steering force. The comparison value between the signals from the first and second sensing units is used to stop the motor when the comparison value is outside a predetermined range.

7 Claims, 7 Drawing Sheets

| a | b | OUT |
|---|---|-----|
| L | L | L |
| L | H | L |
| H | L | L |
| H | H | H |

FIG. 4

| c | d | e | f | g | $Q_1$ | $Q_2$ | $Q_3$ | $Q_4$ |
|---|---|---|---|---|-------|-------|-------|-------|
| L | ✗ | ✗ | ✗ | ✗ | L | L | – | – |
| ✗ | ✗ | ✗ | ✗ | L | L | L | – | – |
| H | L | L | ⊓ | H | ⊓ | L | L | L |
| H | L | H | ⊓ | H | ⊓ | L | H | L |
| H | H | L | ⊓ | H | L | ⊓ | L | L |
| H | H | H | ⊓ | H | L | ⊓ | L | H |

✗ don't care
– don't determine
⊓ PWM control

| TORQUE | 69a | 69b | 69c | 69d |
|--------|-----|-----|-----|-----|
| RIGHT  | H   | H   | L   | L   |
| LEFT   | H   | H   | H   | H   |

ELECTRIC POWER STEERING APPARATUS

BACKGROUND OF THE INVENTION

This invention relates to an electric power steering apparatus in which part of a steering force is provided by an electric motor.

Figure 20:
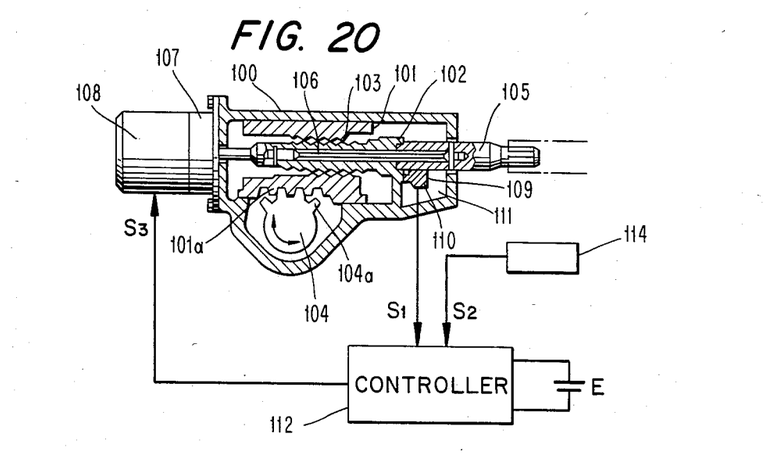
FIG. 20 is a cross-sectional view of the prior art apparatus.

A known apparatus of this general type is disclosed in Japanese Laid-Open Patent Application No. 227560/1984 and also in FIG. 20 of the drawings.

In this apparatus, a steering rotational shaft 102 is axially displaced by a plurality of steel ball bearings 103 into and out of a ball nut 101 positioned in a steering gear box 100 so as to slide horizontally as viewed in FIG. 20. When the shaft 102 is rotated, the steel ball bearings 103 move along a spiral groove formed on the outer surface of the shaft 102 so as to thereby move ball nut 101 axially.

A rack 101a is formed on and extends axially along the outer periphery of ball nut 101 and meshes with a pinion 104a of a sector shaft 104. Accordingly, when ball nut 101 moves axially, as described above, the sector shaft 104 is rotated to thereby move the wheels via a steering member, not shown, connected to sector shaft 104.

The steering rotational shaft 102 is positioned coaxially with a steering shaft 105 integral with a steering wheel, not shown. Both shaft members 102 and 105 are substantially hollow and fixedly connected to each other via a torsion bar 106 inserted therethrough at opposite ends of the torsion bar. The end of shaft 102 which is connected to torsion bar 106 is connected by a reduction device 107 to a drive shaft of an electric motor 108. A torque sensor 109 is provided at the end of steering shaft 105 opposite to the steering wheel. The output signal S1 sensed by torque sensor 109 represents the direction and torque of rotation (hereinafter referred to as torque) of the steering wheel is input to a controller 112 along with the output signal S2 from a vehicle speed sensor 114. An output drive signal S3 from controller 112 controls the direction and torque of rotation of electric motor 108.

As described, the electric power steering apparatus of this known type is intended to provide an arrangement in which the electric motor shares the steering force input in accordance with the direction and torque applied to the steering shaft 105 as sensed by torque sensor 109.

In this known steering apparatus, the direction and torque of the steering shaft are sensed by a single torque sensor to drive the electric motor, so that if trouble occurs in the torque sensing unit, a signal will possibly be produced irrespective of the driver's intention, thereby driving the electric motor and automatically steering the vehicle and possibly leading to an accident. In addition, the torque sensor is operated by use of a relative deviation between the input shaft and the output shaft. Accordingly, if an abnormality occurs in the operating mechanism, a smooth feeling of steering will not be obtained. In a worst case scenario, if the operating mechanism is seized or becomes inoperative during the course of the steering operation, a signal will continue to be produced regardless of the driver's intention and an electric current will continue to flow to the electric motor causing an automatic input to the steering thereby leading possibly to an accident.

It is a technical subject of this invention to prevent a signal of the foregoing type from being generated when there is abnormality in the torque sensor. This would avoid driving the electric motor and reduce the risk of accidents.

SUMMARY OF THE INVENTION

In order to provide a solution to the above described problem, this invention provides an electric power steering apparatus which includes:

an axial converting mechanism for converting the relative rotation between an input shaft and an output shaft to an axial deviation;

a slider element as part of the conversion mechanism and deviatable axially;

a first sensing unit for sensing the axial deviation of the slider and having a lever with torque sensing means, the lever being fixed at one end to a housing and supported at the other end by the slider;

a second sensing unit for sensing the direction of rotation, or the direction and torque of rotation, of a steering wheel; and a controller for comparing the output signals from the first and second sensing units and controlling the direction and torque of rotation of an electric motor which contributes to the steering force, whereby the comparison value between the signals from the first and second sensing units is used to stop the motor when the comparison value is outside a predetermined range.

When the first and second sensing units are operating normally, the comparison value between the output signals from the first and second sensing units compared by the controller falls within a range of predetermined conditions or values. Therefore, the electric motor is driven so that the output shaft of the motor is rotated in the same direction as the input shaft thereof in accordance with signals from both the sensing units to thereby contribute to the steering force.

If an abnormality occurs in either the first sensing unit or in the second sensing unit for some reason, for example, if the slider constituting the axial conversion mechanism is seized or frozen in position, the first sensing unit will continue to produce a signal corresponding to the position where the slider is seized irrespective of the driver's intention while the second sensing unit produces a signal in accordance with the direction of rotation, or the direction and torque of the steering wheel so that the comparison value between the signals output from both the sensing units compared by the controller falls outside the range of the predetermined condition or value. When this is determined, an electric current flowing through the electric motor stops, so that the motor also stops. Thus the signal is prevented from continuing to be produced irrespective of the driver's intention, so that the motor is not driven and manual steering is permitted.

DETAILED DESCRIPTION OF THE PREFERRED EMBODIMENTS

One embodiment of this invention will now be described more specifically with reference to FIGS. 1 and 2.

Figure 1:
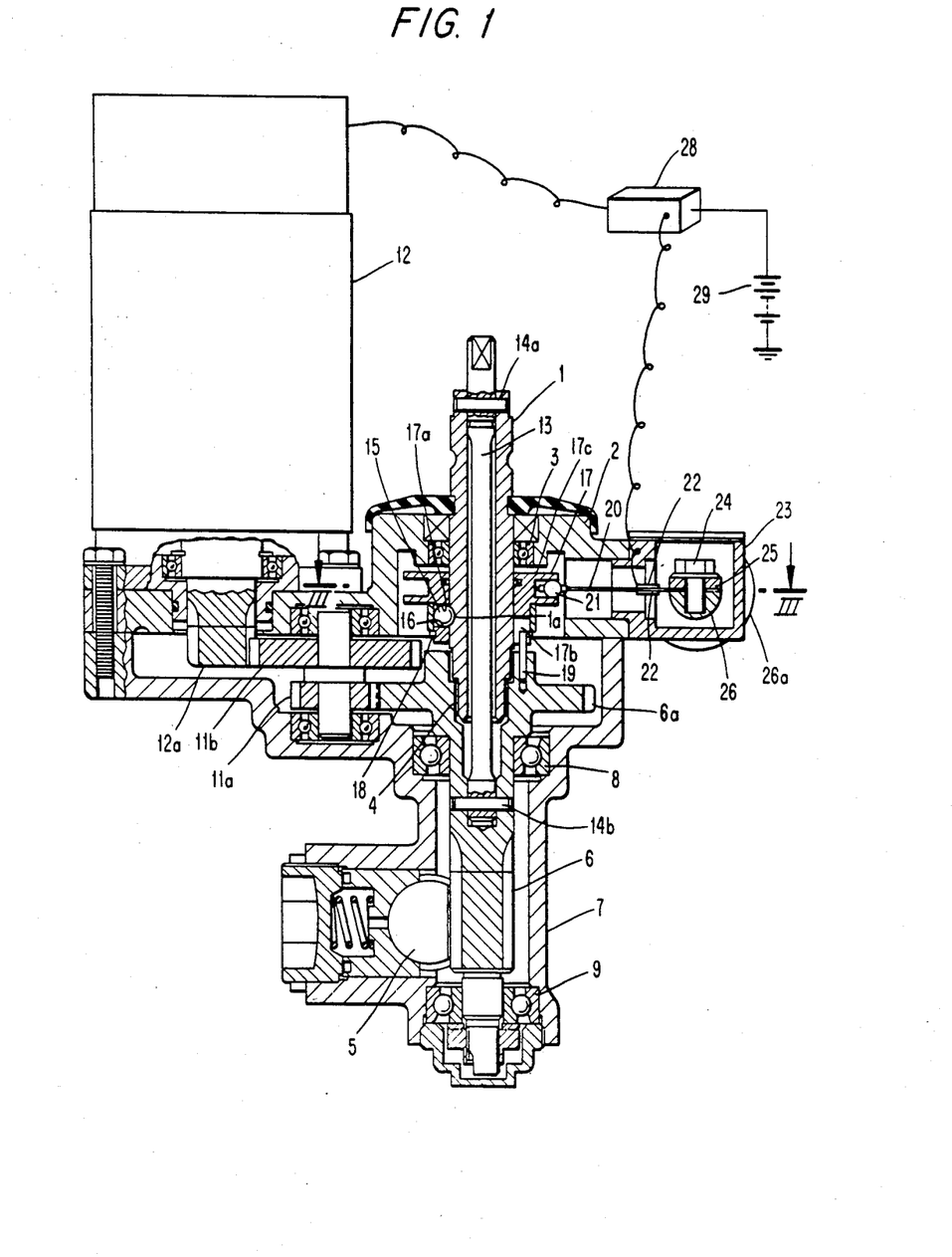
FIG. 1 is a cross-sectional view of one embodiment of an electric power steering apparatus according to this invention.
Figure 2:
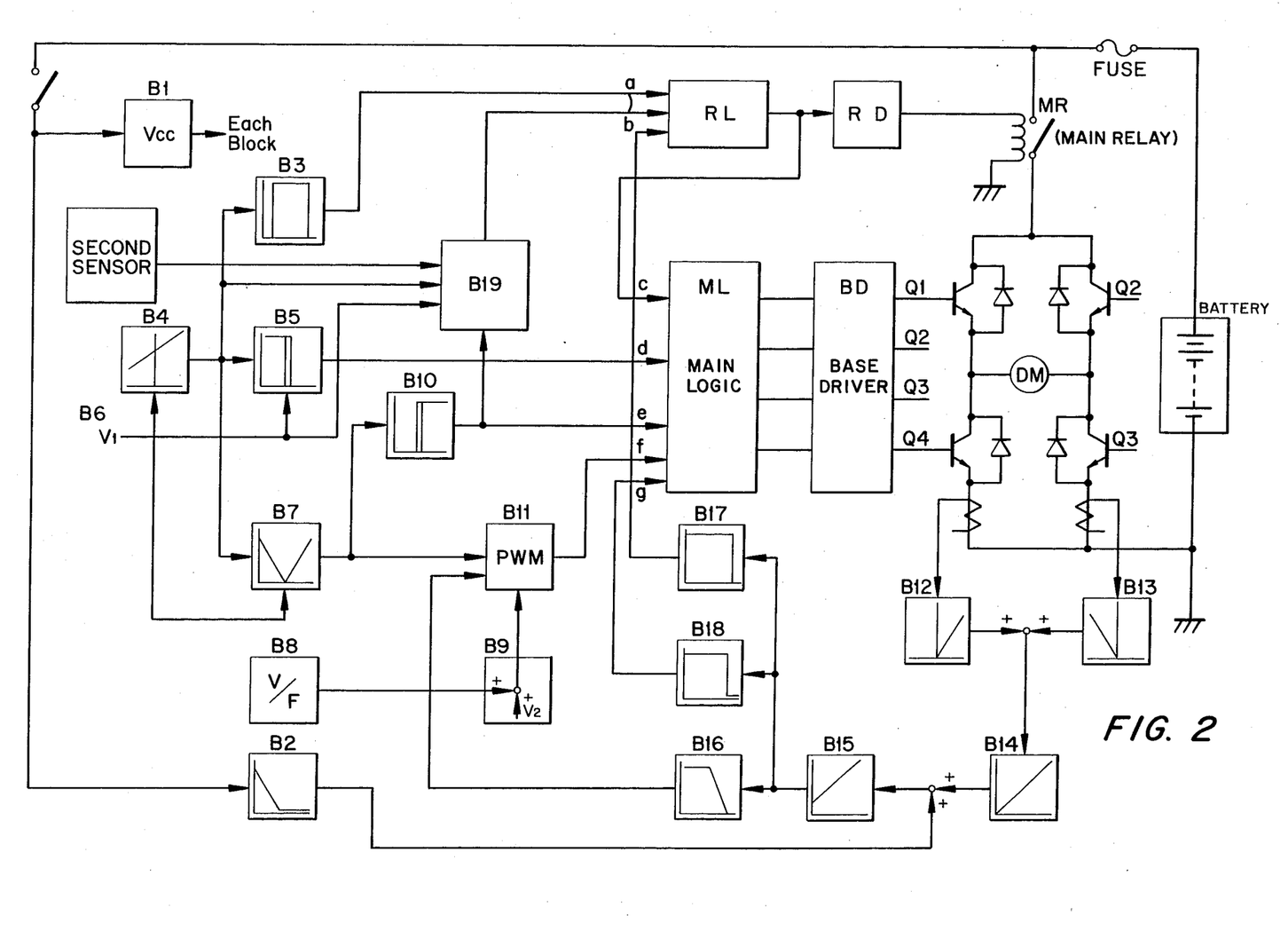
FIG. 2 is a block diagram of a controller of the apparatus shown in FIG. 1.

The electric power steering apparatus shown in FIG. 1 is different from the conventional ball nut type electric power steering apparatus shown in FIG. 20 in that it is a rack and pinion type electric power steering apparatus. It will be obvious, however, that this invention may be applicable to either type of apparatus.

In FIG. 1, reference numeral 1 denotes an input shaft connected at one end to steering wheel 32 via a steering shaft 31 and is integral with a pinion shaft 6 via a torsion bar 13. Namely, input shaft 1 and pinion shaft 6 are coupled via pins 14a and 14b, respectively, to the torsion bar 13.

Input shaft 1 is supported by a bearing 3 which is press fitted into an upper housing 2 on the steering wheel side of the input shaft and at the other or opposite end by a bearing 4 which is press fitted into a cylindrical end of the pinion shaft 6. Pinion shaft 6 is supported by a pair of angular ball bearings 8, 9 which are mounted within a lower housing 7 so as to prevent axial play.

A pinion gear is formed at the end of pinion shaft 6 and meshes with a rack 5 to steer the wheels (not shown). Input shaft 1 has a gear 6a positioned at the end opposite the steering wheel. The gear 6a meshes with a gear 12 via intermediate gears 11a, 11b to thereby form a reduction device.

The gear 12, intermediate gears 11a, 11b and gear 6a of pinion shaft 6 are all formed as helical gears.

A spiral groove 1a is formed on the central portion of input shaft 1 and cooperates with an opening 17a provided in the inner peripheral surface of a cylindrical slider 17. The slider has a flange and is loosely fitted over the input shaft 1 and cooperates with the shaft 1 to hold a ball element 15 between the shaft and the slider.

An annular groove 17c is provided circumferentially on the outer peripheral surface of the slider 17. An axial elongated groove 17b is provided on an end surface of slider 17 facing the pinion shaft 6 and gear 6a. A pin 19 is press fitted into the end surface of pinion shaft 6 and gear portion 6a is engaged within groove 17b so as to permit the slider 17 to move axially along input shaft 1 and to rotate in accordance with rotation of pinion shaft 6. Reference numeral 16 denotes a annular member fitted over the cylindrical portion of slider 17. Reference numeral 18 denotes an elastic retainer ring for preventing the annular member from slipping off the slider.

Figure 6A:
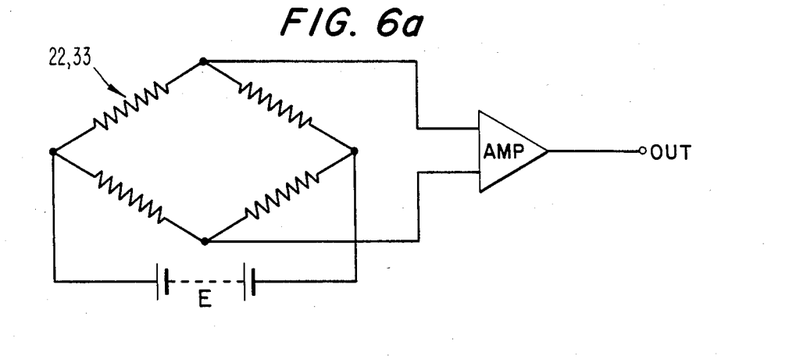
FIG. 6a is a circuit diagram of a strain sensing circuit of each of a first and a second sensing unit used in the embodiment of FIG. 1.
Figure 6B:
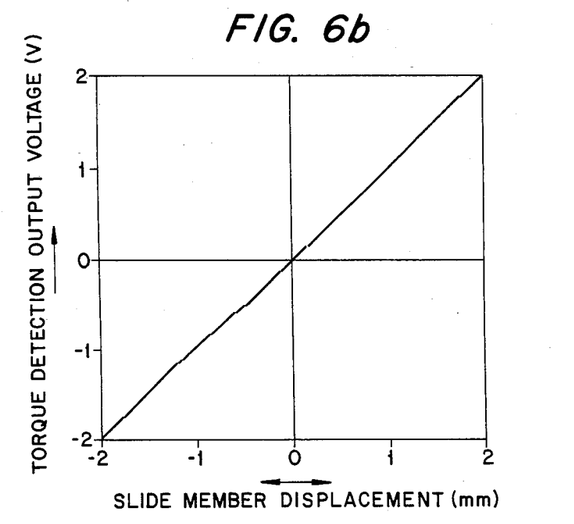
FIG. 6b is a characteristic diagram of the sensed output voltage from the strain sensing circuit of the first sensing unit used in the embodiment of FIG. 1.

Upper housing 2 has a casing 23 within which a leaf spring lever 20 having a ball element 21 at one end, is fixed to the casing 23 at the other end by a bolt 24. Ball element 21 is fitted into or otherwise received in annular groove 17c of slider 17. Fixed or secured to lever 20 are strain gauges 22 (which include an electric element whose resistance varies in accordance with a strain). Strain gauges 22 and lever 20 constitute a first sensing unit in which four strain gauges 22 (only one of which is shown in FIG. 1) are connected in a bridge to form a strain sensor circuit, as shown in FIG. 6a. The sensor circuit has a sensing characteristic, as shown in FIG. 6b, and is connected via a cable to controller 25 so that the electric signal from the sensor circuit is transmitted to the controller.

Figure 6C:
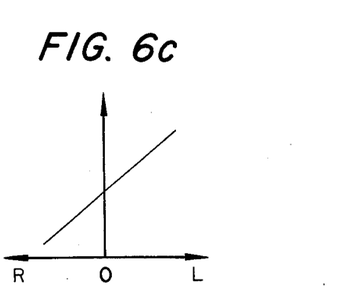
FIG. 6c is a characteristic diagram of the sensed output voltage from the strain sensing circuit of the second sensing unit used in the first embodiment of FIG. 1.

Strain gauges 33, which include an electric element whose resistance varies in accordance with a strain, are fixed to steering shaft 31 which couples and is connected between input shaft 1 and steering wheel 32. The strain gauges 33 constitute a second sensing unit and have a sensing characteristic such as that shown in FIG. 6c. In the same manner as strain gauges 22 constituting the first sensing unit, four strain gauges are connected in a bridge to form a strain sensor circuit, as shown in FIG. 6a. The sensor circuit is connected by a cable to controller 25 so that the electric signal from the sensor circuit is transmitted to the controller.

Figure 3:
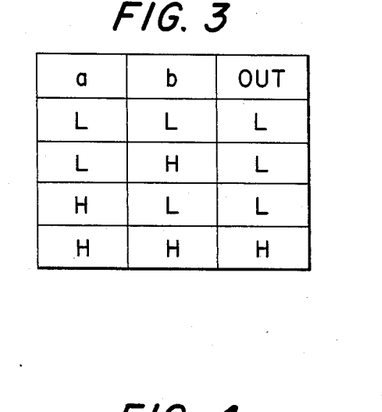
FIG. 3 illustrates the relationship between input and output of a relay logic RL of the controller shown in FIG. 2.
Figure 4:
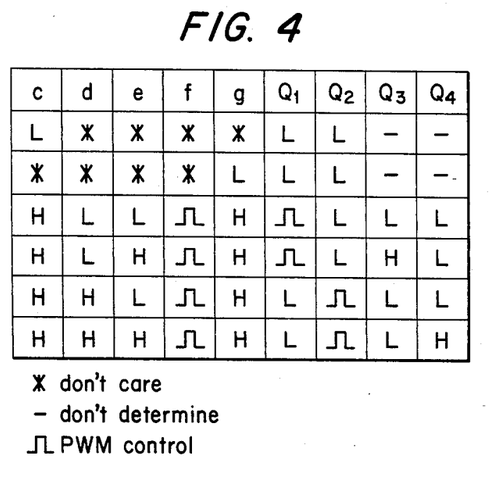
FIG. 4 illustrates the relationship between input and output of a main logic ML of the controller shown in FIG. 2.

Controller 25 will now be described in more detail with reference to FIG. 2 in which controller 25 includes circuit B1 which supplies a voltage Vcc from a battery 35 to respective circuit blocks; a circuit B2 which gradually increases its output when the battery voltage falls below a predetermined value; and a circuit B4 which includes a PID (proportion, integration and differentiation) compensation circuit which smooths or damps a fluctuation in the electric signal from the first sensing unit which may arise due to a delay in the operation of the mechanical system and amplifies the input DC signal linearly. A comparator B3 includes an abnormality sensing unit output circuit which changes its output to a low level when the output from circuit B4 is below a predetermined value and above a second predetermined value which is higher than the first predetermined value. A comparator B5 has a sensing unit output direction determining circuit which produces a high level output when the output of B4 exceed a reference voltage V1 and produces a low level output when the output of B4 falls below the reference voltage V1, the comparator B5 has a hysteresis characteristic for preventing chattering. A linear amplifier B7 includes an absolute value circuit having a output signal representative of the magnitude of the difference between the output from circuit B4 and the reference voltage V1. B8 indicates a sawtooth waveform generator and B9 is an adder which adds a reference voltage V2 to the B output signal of the waveform generator B2. A comparator B10 has a hysteresis characteristic and sets the start point where the DC electric motor DM is energized (dead zone) and produces a high-level output when the output of B7, which is proportional to the magnitude of the input signal, exceeds a predetermined value. A comparator B11 compares the output of B9, i.e., the sawtooth waveform with reference voltage and the output of B7 (proportional to the magnitude of the input signal) and includes a pulse width modulation (PWM) circuit which turns on and off the electric current flowing through the DC electric motor DM at predetermined short periods and changes the on-off duty cycle to variably control a quantity of driving the DC motor DM. Also included is a motor current sensing circuit which includes a pair of differential amplifiers B12, B13 which differentially amplify the voltages across the corresponding shunt resistors; an adder B14 for the amplifiers B12 and B13 which has an output proportional to the magnitude of the motor current. An adder B15 adds the outputs of B2 and B14 and provides an output signal representative of the sensed current modified by the voltage drop across the battery. Integration circuit B16 includes an average current sensing circuit which smooths or damps the sensed electric current signal and including an average electric current sensing circuit which produces a high-level output when the sensed current signal is below a predetermined value and produces a gradually decreasing output when the sensed current signal exceeds the predetermined value. The integration circuit clamps the output with a diode before the comparator B11 compares the absolute value of the output of circuit B16 with a sawtooth waveform. Circuit B17 is an abnormal current sensing circuit which produces a low level signal when the sensed current signal exceeds the predetermined level and which provides an output to a relay logic RL, to be described later, to control a main relay. Circuit B18 is a temporary current control circuit which changes its output to a low level so as to switch off a PWM signal when the sensed current signal exceeds the preset value. The relay logic RL changes its output to a low level to switch off the main relay as shown by the relationship between inputs a, b and the output shown in FIG. 3 when the sensed output from the first or second sensing unit is abnormal or when an abnormal current occurs. A main logic circuit ML is provided for control of its outputs to output transistors Q1, Q2, Q3, Q4 via a base driver BD, as shown in the relationship between inputs c, d, e, f, g from the respective blocks and its output shown in FIG. 4, to control the rotation and direction of rotation of DC electric motor DM. A determination circuit B19 for determining an anti-assist mode (autosteer) when the sensed output signals from the first and second sensing units are opposite and thereby change the output to a low level. The graph in each block shows the electric input-output characteristic of the block in which the axis of abscissas shows an input level while the axis of ordinates shows an output level. The set values for average current sensing circuit B16, abnormal current sensing circuit B17 and temporary current limiting circuit B18 have the relationship B16 < B18 < B17. The relay logic RL has a filter to neglect a low level signal of less than tens of milliseconds.

Figure 5:
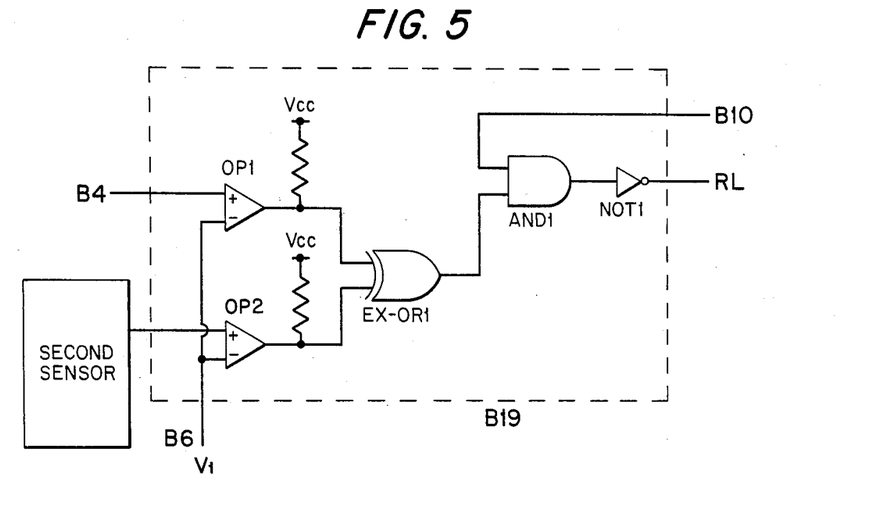
FIG. 5 is an electric circuit diagram of a determination circuit B19 of the controller shown in FIG. 2.

The anti-assist mode (autosteer) determination circuit B19 has a structure shown in FIG. 5. The output signal from PID compensation circuit B4, namely, the electric signal output from the first sensor and the electric signal output from the second sensor are compared with reference voltage V1 at comparators OP1 and OP2, respectively. Each comparator output has a high level signal when the corresponding electric signal is higher than V1 and a low level signal when the electric signal is lower than V1. The respective output signals from the comparators provide an input to an exclusive OR gate EX-OR1, the output signal from which is input together with the output signal from the comparator B10 to an AND gate AND1. The output signal from AND1 is inverted by a NOT gate NOT1 and is an input signal to an input terminal of the relay logic RL. By such structure, when the output signal from PID compensation circuit B4 or the electric signal from the first sensing unit and the electric signal from the second sensing unit are at different levels, namely, opposite, the determination circuit B19 determines that the anti-assist mode (autosteer) operation occurs to change the output signal to a low level which is applied to the relay logic RL to switch off the main relay MR to allow an electric current to the electric motor DM to flow through the main relay and stop the motor.

The operation of this embodiment having the above structure will be described with reference to FIGS. 1 and 2.

When the steering shaft 32 is rotated, it rotates the input shaft 1 via steering shaft 31 to twist torsion bar 13 relative to pinion shaft 6 which is coupled via the rack to the wheels, so that the pinion shaft 6 and input shaft 1 rotate relative to each other.

The relative rotation of the input shaft 1 causes the helical groove 1a to rotate by the difference in rotation between input shaft 1 and pinion shaft 6 to thereby apply an axial thrust to slider 17 via ball elements 21 to shift slider 17 axially in accordance with the rotation of the input shaft.

The axial shifting of slider 17 causes lever 20 holding ball element 21, engaged in the annular groove 17c in slider 17, to flex. This causes strain gauges 22, having the sensing characteristic shown in FIG. 6, to generate from the first sensing unit an electric signal corresponding to a quantity of relative rotation between input shaft 1 and pinion shaft 6. The electric signal from the strain gauges 22 or the first sensing unit is transmitted as an input to the controller 25.

Strain gauges 33, constituting the second sensing unit, are fixedly connected to the steering shaft 31 and has the same sensing characteristic as strain gauge 22 constituting the first sensing unit as shown in FIG. 6, generate an electric signal in accordance with the direction and torque of rotation of steering shaft 32 due to torsion of the steering shaft as determined by rotation of the steering wheel 32. The electric output signal from strain gauges 33 or the second sensing unit is transmitted as an input to the controller 25.

The electric signal transmitted from strain gauges 22 (first sensing unit) and input to controller 25 is delivered via PID compensation circuit B4 to determination circuit B19 shown in FIG. 5. Similarly, the electric signal from strain gauges 33 (second sensing unit) is also transmitted to the determination circuit 19. When the first and second sensing units are operating in accordance with normal conditions or within a range of predetermined conditions, the electric output signals from both strain gauges 22 and 33 (first and second sensing units) are at the same level, so that as described above, the output signal from determination circuit B19 becomes high and is transmitted to the input terminal of relay logic RL to thereby turn on main relay MR. This results in an electric current to flow therethrough to electric motor DM. As a result, as shown in the relationship between inputs c, d, e, f, g (from the corresponding blocks) and output of the main logic ML in FIG. 4, the output signal from the main logic is applied via base driver BD to output transistors Q1, Q2, Q3, Q4 to turn the transistors on and off, so that the direction and quantity of an electric current applied to motor DM are controlled.

Motor DM is decelerated via drive shaft gear 12, intermediate gears 11b, 11a and gear 6a of pinion shaft 6 to rotate pinion shaft 6. This causes rack 5 to move to thereby alter the direction of the wheels and increasing the steering force.

At this time, pinion shaft 6, rotated by motor DM, is rotated in the direction in which the relative rotation between input shaft 1 and pinion shaft 6 becomes null or zero. As a result, slider 17 is returned to the position where the torsion of lever 20 becomes null by pin 19 projecting from end surface of pinion shaft 6.

The operation of the apparatus, when the sensing unit is abnormal, as an object of this invention will be described. When the first or second sensing unit become abnormal, i.e., transmits an abnormal signal, for example, the slider 17 constituting part of an axial change mechanism is seized, strain gauges 22 (first sensing unit) generate a signal depending on the position where the slider 17 is seized irrespective of the driver's intention and movement of the steering wheel. The electric signal so generated is transmitted as an input to the determination circuit B19. On the other hand, strain gauges 33 (second sensing unit) generate an electric signal depending on the direction of rotation and torque of the steering wheel 32, as discussed above, and the signal is input to determination circuit B19 so that the electric signals from strain gauges 22 and 33 (first and second sensing units) may be at different levels in which case the determination circuit B19 applies a low electric signal to the input terminal of relay logic RL to thereby turn off main relay MR. This causes motor DM to stop and hence prevents autosteering, i.e., permitting unassisted manual steering.

Although not shown in FIG. 1, a clutch may be interposed between motor DM and gear 12 to interrupt one from the other in order to improve a sensation of manual steering when motor DM is at rest.

Figure 7:
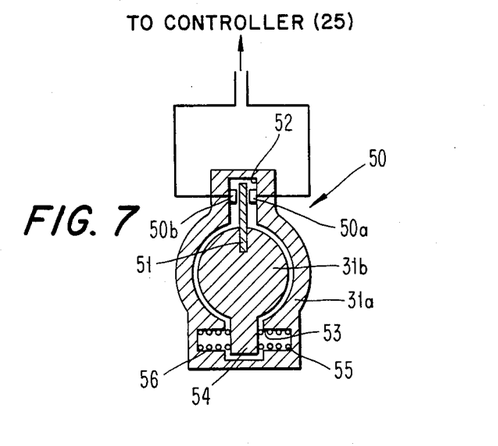
FIG. 7 is a cross-sectional view of another embodiment of the second sensing unit in this invention.

FIG. 7 is a determination unit 50 showing another embodiment of the second sensing unit which includes strain gauges 33 of the first embodiment according to this invention, described above. The steering shaft 31 of FIG. 1 is provided as a double structure which includes an outer shaft 31a coupled to input shaft 1 and an inner shaft 31b coupled to steering wheel 32. A movable contact 51 is inserted into a first groove 52 in outer shaft 31a and is fixed to inner shaft 31b. Contacts 50a, 50b are fixed in the groove 52 in outer shaft 31a with the movable contact 51 being loosely received between fixed contacts 50a and 50b. The fixed contacts are connected by a cable to the controller 25. Outer shaft 31a has a second groove 53 at a symmetrical position with reference to first groove 52 and receives therein a protrusion 54 of inner shaft 31b. Provided under tension in the second groove 53 are springs 55, 56 which normally maintain movable contact 51 loosely between fixed contacts 50a and 50b to thereby maintain the determination unit 50 in an off condition.

Figure 8:
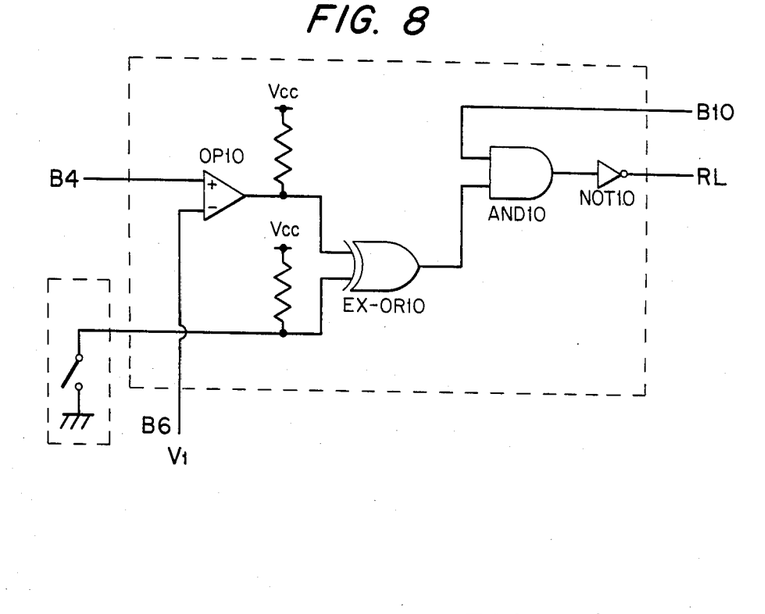
FIG. 8 is an electric circuit diagram of a determination circuit B19 used with the second sensing unit shown in FIG. 7.
Figure 9:
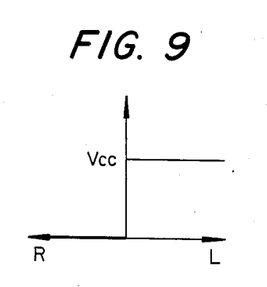
FIG. 9 is a characteristic diagram showing the sensing characteristic of the second sensing unit shown in FIG. 7.

The sensing characteristic of this determination unit 50 is shown in FIG. 9. In this case, the determination circuit B19 in the block diagram of controller 25 shown in FIG. 2 has a different structure, shown in FIG. 8, which operates in a similar manner to that of the determination circuit shown in FIG. 5 and used in the previous embodiment. However, this arrangement provides an example wherein the contact 50a may be removed so as to leave only contact 50b to turn on the determination unit when the steering wheel is turned left.

The operation of the determination unit 50 (second sensing unit) will now be described with reference to FIG. 7.

If the steering wheel 32 is, for example, turned to the left, movable contact 51 contacts the fixed contact 50b to turn on determination circuit 50, so as to produce a high level electric signal which is delivered to controller 25 and hence to the input terminal of determination circuit B19 shown in FIG. 8. When the steering wheel is turned to the right, the determination circuit 50 is turned off to deliver a low level signal. The operation of the determination circuit B19 shown in FIG. 8 is similar to that of the previous embodiment, further description on subsequent operations will be omitted.

Figure 10:
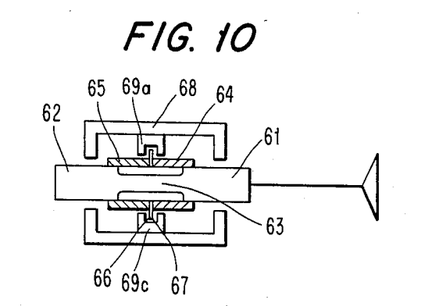
FIG. 10 is a cross-sectional view of another embodiment of the second sensing unit in this invention.

FIG. 10 shows a determination unit 60 using a photointerrupter as another embodiment of the second sensing unit in this invention.

The determination unit 60 uses first and second shafts 61 and 62 which are connected to the steering wheel and the input shaft, respectively, and which in turn are connected to a torsion bar 63, instead of the steering shaft 31 as in the previous embodiment.

Figure 11:
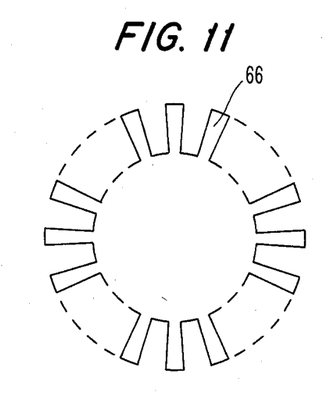
FIG. 11 is a plan view of a slit in FIG. 10.
Figure 12:
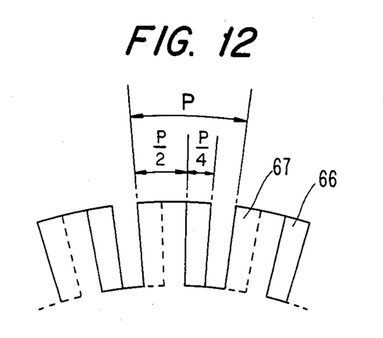
FIG. 12 is an arrangement plan of the slits, on enlarged scale, of a slit as shown in FIG. 10.

First shaft 61 has one end fitted into and fixed to a first sleeve 64 while a second shaft 62 has one end fitted into and fixed to a second sleeve 65 with slits 66, 67 having the shape as shown in FIG. 11 being fixed to the adjacent end faces of both sleeves 64 and 65, respectively. It is to be noted that both slits 66 and 67 are rotatable relative to each other and take a relative position shown on large scale in FIG. 12 when the driver applies no steering force to the steering wheel.

Figure 13:
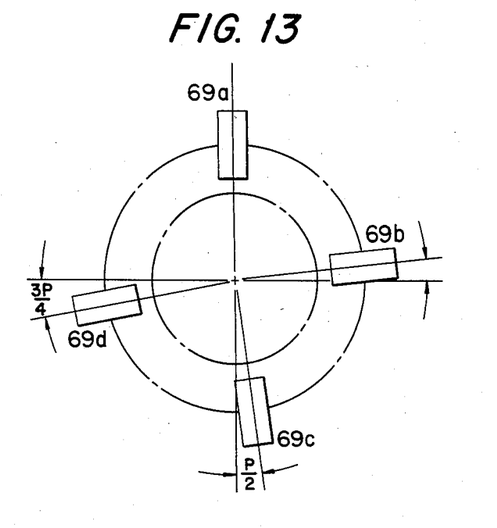
FIG. 13 is an arrangement plan of photointerrupters in FIG. 10.

A casing 68 is fixed to, for example, the chassis so as to surround shafts 61, 62 and torsion bar 63. Four photointerrupters 69a, 69b, 69c and 69d are disposed on the inner peripheral surface of casing 68, as shown in FIG. 13, so as to receive slits 66 and 67 at their grooves. It is to be noted that these photointerrupters are disposed so as to shift by the predetermined amount P/4 from the center of vanes of the respective slits 66 and 67, as shown in FIG. 13.

The torsion bar 63 which connects both shafts 61 and 62 to amplify a torsion due to a torque applied has a stopper mechanism which mechanically couples shafts 61 and 62 when the relative torsion angle between both shafts 61 and 62 becomes ±P/4.

Figure 14:
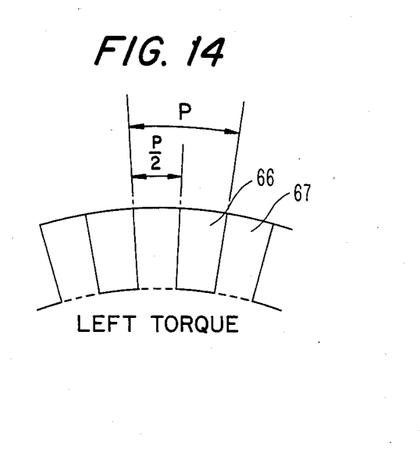
FIG. 14 is an arrangement plan of the slits in FIG. 12 when left torque is applied to the steering wheel.
Figure 15:
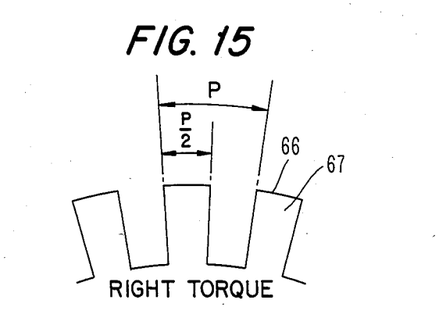
FIG. 15 is a arrangement plan of the slits in FIG. 12 when right torque is applied to the steering wheel.
Figure 16:
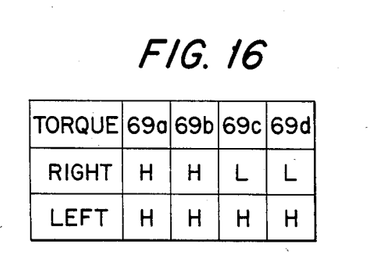
FIG. 16 illustrates the relationship between input and output of the second sensing unit shown in FIG. 10.
Figure 19:
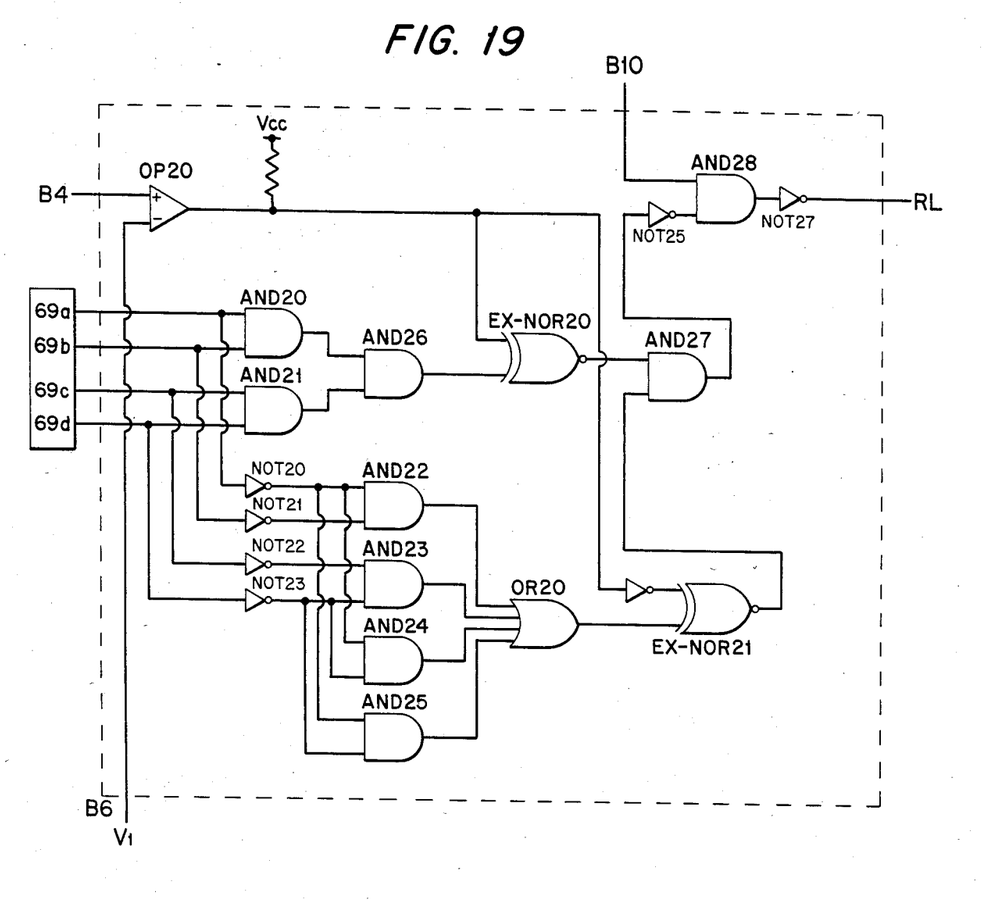
FIG. 19 is an electric circuit diagram of a determination circuit B19 used with second sensing unit shown in FIG. 10.

According to the determination unit 60, when right and left torques are applied to the steering wheel, both slits 66 and 67 take the relative positions shown in FIG. 14 (left torque) and in FIG. 15 (right torque), respectively, so that the output signals from photointerrupters 69a, 69b, 69c and 69d goes to a high level when the optical axes of the photointerrupters are shut off or interrupted by slits 66 and 67 while the output signals from the photointerrupters are low level otherwise and the sensing characteristic of the photointerrupters is shown in FIG. 16. Thus, the determination circuit B19 of controller 25 shown in FIG. 2 which receives the output signals from photointerrupters 69a, 69b, 69c and 69d outputs or transmits a low output signal to be applied to the input terminal of relay logic RL when the output level from determination unit 60 (second sensing unit) and the output signal level from PID compensation circuit B4 or the electric signal from the first sensing unit are different, so as to turn off the main relay MR and stop the motor DM. The operation of the determination circuit B19 will be understood from FIGS. 19 and 2 and further description thereon will be omitted.

Figure 17:
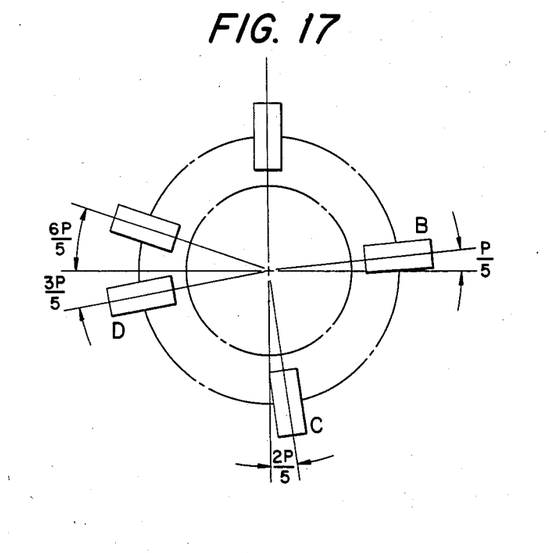
FIG. 17 is an arrangement plan of photointerrupters showing a modification of the second sensing unit shown in FIG. 10.
Figure 18:
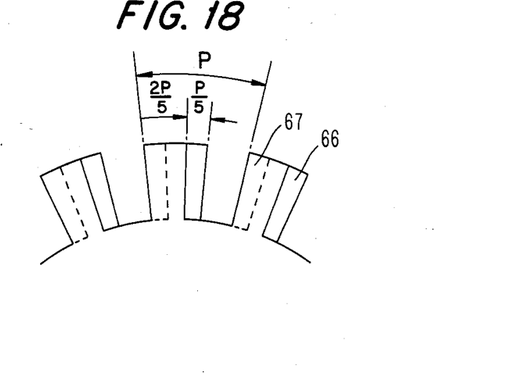
FIG. 18 is an arrangement plan of slits, on enlarged scale, in the modification shown in FIG. 17.

While in this embodiment four photointerrupters which constitute the determination unit 60 are used, five photointerrupters may be disposed within casing 68, as shown in FIG. 17 in which both slits 66 and 67 are disposed at a relative position shown in FIG. 18 and the mechanical coupling between shafts 61 and 62 is set to be ±P/5.

Thus this modification is capable of determining right and left torques using the output signals from photointerrupters 69a, 69b, 69c, 69d and 69e and also can be used as a steering angle sensing unit already used and implemented as a sensing unit for correction of lateral G forces, etc., in the power steering.

While the determination unit using contact switches and the determination unit using photointerrupters as other embodiments of the second sensing unit have been described, a potentiometer and a photosensitive unit may be used to sense a deviation of slider 17 or lever 20 or otherwise the direction of an electric current flowing through motor DM when the motor is rotated forwardly and backwardly.

As described above, according to this invention, the arrangement is such that electric signals from the first and second sensing units are compared. When the levels of the electric signals are outside different predetermined ranges of values, the main relay through which an electric current flows to the electric motor is turned off to thereby stop the motor and hence permit manual steering. Therefore, for example, when an indicated or detected abnormality occurs in the first or second sensing unit, signals which would otherwise drive the electric motor and leading to autosteering (anti-assist) are prevented from being produced. Thus, an electric power steering apparatus excellent in safety is provided.

In order to further solve the problems relating to the conventional apparatus, it could be conceived to construct the first sensing unit in a multi-system. However, the first sensing unit would require a high level of accuracy to control electric power steering and a complicated large-sized structure which would render the entire apparatus expensive. In contrast, according to this invention, the first sensing unit is irrespective of the second sensing unit, so that the individual first and second sensing units do not require such high accuracy. The apparatus is simple in structure, inexpensive, and small-sized. In addition, when the apparatus operates erroneously due to noise, etc., the mechanism constituted by this invention rapidly turns off the electric system, so that the steering wheel will not be out of control.

What is claimed is:

1. An electric power steering apparatus comprising:
   an axial conversion means for converting the relative rotation between an input shaft and an output shaft to an axial deviation;
   the axial conversion means including an axially moveable slider element;
   a first sensing means for sensing the axial deviation of the slider and including a lever with torque sensing means, the lever being fixed at one end to a housing and supported at the other end by the slider;
   a second sensing means for sensing the direction and torque of rotation of a steering wheel;
   a controller means for obtaining a comparison value by comparing output signals from the first and second sensing means and controlling the direction and torque of rotation of an electric motor which contributes to the steering force and for stopping the motor when the comparison value is outside a predetermined range.

2. An electric power steering apparatus of claim 1, wherein the axial conversion means comprises an input shaft coupled at one end to a steering shaft and at the other end to a pinion shaft via a torsion bar, a hollow cylindrical slider fitted over the input shaft and engaged in a helical groove provided in an outer surface of the input shaft for moving the slider is axially of the input shaft and along the helical groove by twist of the torsion bar due to relative rotation of the input shaft and the pinion shaft;
   the lever being fixed at one end to the housing and held at the other end in an annular groove provided on an outer peripheral surface of the slider and a strain gauge fixedly connected to the lever; and
   the second sensing means including a strain gauge fixed to an outer peripheral portion of the steering shaft.

3. An electric power steering apparatus of claim 2, wherein the second sensing means includes an on-off determination unit which is turned on when the input shaft is rotated in one direction and turned off when the input shaft is rotated in the opposite direction.

4. An electric power steering apparatus of claim 2, wherein the second sensing means includes an on-off determination unit which is turned on and produces a high-level electric signal when the input shaft is rotated in one direction and is turned off to produce a low-level electric signal when the input shaft is rotated in the opposite direction.

5. An electric power steering apparatus of claim 3, wherein the on-off determination unit produces a predetermined electric signal only when the input shaft is rotated in one direction.

6. An electric power steering apparatus of claim 1, wherein the second sensing means includes a first shaft connected to the steering wheel and a second shaft connected to the input shaft, the first and second shafts constituting the steering shaft; a torsion bar connecting the first and second shafts; a first sleeve fixed to one end of the first shaft; a second sleeve fixed to one end of the second shaft; a pair of slits provided respectively to opposing ends of the first and second sleeves; a casing fixedly connected to a chassis and surrounding the first and second shafts and the torsion bar; and, photointerrupters fixed to an inner peripheral surface of the casing so as to receive both the slits at their grooves.

7. An electric power steering apparatus of claim 1, wherein the controller includes drive means for controlling the direction and torque of rotation of the electric motor in accordance with an electric output signal from the first sensing means and determination means for comparing the electric output signals from the first and second sensing units for stopping the electric motor when the comparison value is different from a set value.

* * * * *